US010397059B2

(12) United States Patent
Li

(10) Patent No.: US 10,397,059 B2
(45) Date of Patent: Aug. 27, 2019

(54) ROUTER CONTROLLING

(71) Applicant: HEWLETT PACKARD ENTERPRISE DEVELOPMENT LP, Houston, TX (US)

(72) Inventor: Jinglin Li, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/546,002

(22) PCT Filed: Jan. 29, 2016

(86) PCT No.: PCT/CN2016/072736
§ 371 (c)(1),
(2) Date: Jul. 24, 2017

(87) PCT Pub. No.: WO2016/119743
PCT Pub. Date: Aug. 4, 2016

(65) Prior Publication Data
US 2018/0006890 A1 Jan. 4, 2018

(30) Foreign Application Priority Data

Jan. 30, 2015 (CN) .......................... 2015 1 0049733

(51) Int. Cl.
H04L 12/801 (2013.01)
H04L 12/24 (2006.01)
(Continued)

(52) U.S. Cl.
CPC .......... H04L 41/0879 (2013.01); H04L 41/00 (2013.01); H04W 88/12 (2013.01); H04W 88/18 (2013.01)

(58) Field of Classification Search
CPC ...... H04W 88/18; H04W 92/02; H04W 88/16
See application file for complete search history.

(56) References Cited

U.S. PATENT DOCUMENTS 9,787,501 B2 * 10/2017 Sung ................... H04L 12/4641
2003/0115482 A1 * 6/2003 Takihiro .............. H04L 63/0227
726/9
(Continued)

FOREIGN PATENT DOCUMENTS

CN 1767497 A 5/2006
CN 101119320 A 2/2008
(Continued)

OTHER PUBLICATIONS

International Search Report and Written Opinion, International Application No. PCT/CN2016/072736, dated May 5, 2016, pp. 1-6, SIPO.

(Continued)

Primary Examiner — Faruk Hamza
Assistant Examiner — Abusayeed M Haque
(74) Attorney, Agent, or Firm — Hewlett Packard Enterprise Patent Department

(57) ABSTRACT

In an example, an aggregation router encapsulates a first Console command as a control packet in an Ethernet format, determines a target branch router of the control packet, and transmits the control packet to the target branch router via an Ethernet link between the aggregation router and the target branch router, so that the target branch router can decapsulate the control packet to obtain and execute the first Console command. The aggregation router receives a feedback packet from the target branch router via the Ethernet link between the aggregation router and the target branch router, wherein the feedback packet comprises an output result obtained by the target branch router through executing the first Console command.

8 Claims, 5 Drawing Sheets

(51) Int. Cl.
*H04L 12/751* (2013.01)
*H04W 88/12* (2009.01)
*H04W 88/18* (2009.01)

(56) References Cited

U.S. PATENT DOCUMENTS

| | | | |
|---|---|---|---|
| 2008/0056300 A1* | 3/2008 | Williams | H04L 12/4633 370/466 |
| 2014/0105030 A1 | 4/2014 | Kogan | |
| 2014/0181021 A1* | 6/2014 | Montulli | G06F 16/137 707/624 |
| 2014/0181579 A1* | 6/2014 | Whitehead | G06F 11/1451 714/15 |
| 2014/0317616 A1* | 10/2014 | Chu | G06F 9/45533 718/1 |
| 2015/0009991 A1 | 1/2015 | Sung et al. | |
| 2015/0341273 A1* | 11/2015 | Naouri | H04L 47/18 370/231 |

FOREIGN PATENT DOCUMENTS

| | | |
|---|---|---|
| CN | 101262376 A | 9/2008 |
| CN | 101378330 A | 3/2009 |
| CN | 102148698 A | 8/2011 |
| CN | 103368847 A | 10/2013 |
| CN | 104283713 A | 1/2015 |
| WO | WO-2015001394 A1 | 1/2015 |

OTHER PUBLICATIONS

International Preliminary Report on Patentability received for PCT Application No. PCT/CN2016/072736, dated Aug. 10, 2017, 5 pages.

* cited by examiner

| Target address | Source address | Type | Data | CRC |
|---|---|---|---|---|
| 6 | 6 | 2 | 46~1500 | 4 |

| Type 09FF | Distinguishing flag | Console command/Output result |
|---|---|---|
| 2 | 1 | 45~1499 |

ROUTER CONTROLLING

BACKGROUND

Routers are gateway devices, and are used to connect networks that are logically separated, e.g., local area networks, wide area networks. Routers have been widely used in various trades, and have become important devices to implement connections within a backbone network, between backbones and between a backbone and an Internet. Data transmission from a subnet to another subnet can be implemented through routing functions of the routers. The routers have functions of determining network addresses and selecting IP paths, which enables them to establish flexible connections in a multi-networking environment. In the multi-networking environment, the routers can use different data grouping methods and media access methods to connect various subnets.

DETAILED DESCRIPTION

The present disclosure will be illustrated in detail hereinafter with reference to the accompanying drawings and specific examples.

With rapid development of cloud computing, network deployment becomes flat. As the number of network branches increases, there are more and more remote branch routers in the network deployment. Specialized administrators are usually not configured at locations of branch routers.

A remote branch router may be controlled through a remote device or through a local Console interface of the remote branch router.

However, if the remote branch router is controlled through the local Console interface of the remote branch router, the remote branch router has to be controlled locally, which means that an administrator has to be dispatched to the location of the branch router, which is hard for operation. If the remote branch router is controlled through the remote device, each branch router is recognized through the IP address of the branch router. However, if a certain condition (e.g., wrong configuration, IP address loss) occurs, it is hard to configure the branch router in the remote network management manner.

A Console control method over Ethernet (also referred to as "Console over Ethernet") is provided according to some examples of the present disclosure, so as to control a remote branch router via an aggregation router.

Figure 1:
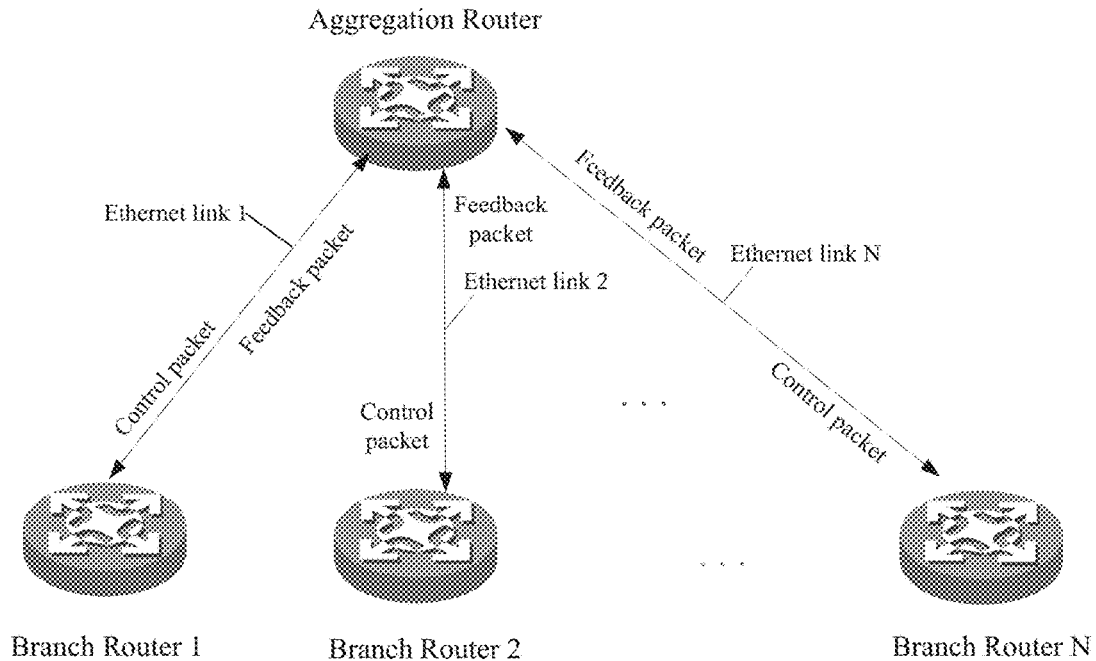
FIG. 1 is a schematic diagram illustrating a network topology of an aggregation router and branch routers according to some examples of the present disclosure.

FIG. 1 is a schematic diagram illustrating a network topology of an aggregation router and branch routers according to some examples of the present disclosure. As shown in FIG. 1, an aggregation router is connected to each branch router, so that a single aggregation router corresponds to multiple remote branch routers.

Figure 2:
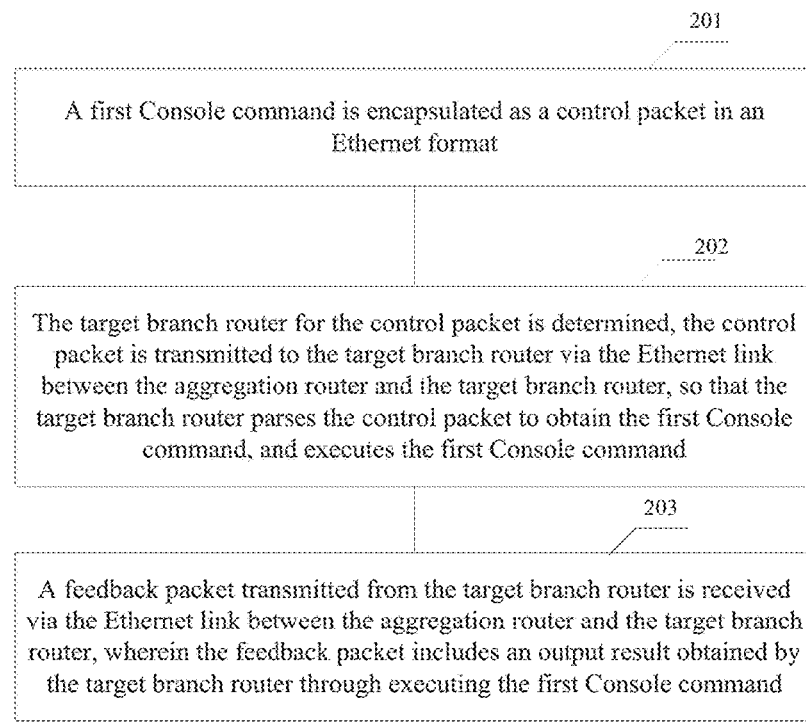
FIG. 2 is a schematic diagram illustrating a router controlling method applying to an aggregation router in a network topology in FIG. 1 according to some examples of the present disclosure.

FIG. 2 is a schematic diagram illustrating a router controlling method applying to an aggregation router in a network topology in FIG. 1 according to some examples of the present disclosure. This method may apply to the aggregation router.

As shown in FIG. 2, the method includes procedures as follows.

At block 201, a first Console command is encapsulated as a control packet in an Ethernet format.

In some examples, a first Console command is used to control the branch router, e.g., configuring an IP address of an interface on the router, a protocol used on the interface, etc.

The aggregation router may obtain the first Console command used to control the branch router through various methods. For example, a host computer is connected with the aggregation router via a serial interface on the host computer and a Console interface on the aggregation router. An administrator may input a command line as the first Console command through the host computer, and the host computer directly forwards the inputted first Console command to the aggregation router via the serial port connected with the console interface on the aggregation router. The aggregation router may receive the first Console command via the Console interface on the aggregation router. For another example, the host computer is connected with the aggregation router via a network management interface. The host computer may encapsulate the inputted first Console command into a management packet based on a network protocol (e.g., File Transfer Protocol (FTP), Simple Network Management Protocol (SNMP), etc.) used on the network management interface (e.g., an Ethernet interface), and may transmit the management packet to the branch router via the network management interface. The aggregation router may receive a management packet including the first Console command from a network management interface of the aggregation router, and may parse the management packet to obtain the first Console command.

In some examples, the host computer is connected with the aggregation router via the Console interface. The administrator inputs a command line as the first Console command via the host computer, and the host computer directly forwards the inputted command line to the aggregation router. The aggregation router receives the command line as the Console command via the Console interface of the aggregation router, and determines whether the parsed Console command is for the aggregation router or for the branch router according to the preset command keyword. When the parsed Console command is for the aggregation router itself, the aggregation router directly executes the control command. When the parsed Console command is for the branch router (i.e., the first Console command), the aggregation router encapsulates the first Console command as the control packet in the Ethernet format.

For example, assume that a command keyword "console" indicates that the control command is for the branch router, and a command key "local" indicates that the control command is for the aggregation router. When a command line "console display version" is received via the Console interface of the aggregation router, according to the command keyword "console", the aggregation router determines that the Console command is for the branch router, and further determines that the control command is "display version". The aggregation router encapsulates the control command "display version" as the control packet in the Ethernet format.

In some examples, the host computer is connected with the aggregation router via a network management interface. Based on an instruction inputted by the administrator, the host computer generates the management packet including the first Console command, and transmits the management packet to the aggregation router via the network management interface of the host computer. The aggregation router receives the management packet via the network management interface of the aggregation router, parses the management packet to obtain the control command, and determines whether the control command is for the aggregation router or for the branch router. When the control command is for the aggregation router, the aggregation router directly executes the control command. When the control command is for the branch router (i.e., the first Console command), the aggregation router encapsulates the first Console command as the control packet in the Ethernet format.

The aggregation router may further add a preset type character into a type field of the control packet. After the control packet is received, a target branch router determines not to discard the control packet based on the type character.

At block 202, the target branch router for the control packet is determined, the control packet is transmitted to the target branch router via the Ethernet link between the aggregation router and the target branch router, so that the target branch router parses the control packet to obtain the first Console command, and executes the first Console command.

In some examples, when the aggregation router receives the command line including the first Console command via the Console interface of the aggregation router, the command line further includes Ethernet link interface information. According to a relation between the Ethernet link interface information and the target branch router, the aggregation router may determine the target branch router for the control packet based on the Ethernet link interface information.

In particular, the Ethernet link interface information in the command line may be for a single Ethernet link interface or for multiple Ethernet link interfaces. When the Ethernet link interface information is for the single Ethernet link interface, there is one corresponding target branch router. And the aggregation router transmits the control packet to the single target branch router via an Ethernet link between the aggregation router and the single target branch router. When the Ethernet link interface information is for the multiple Ethernet link interfaces, there are multiple corresponding target branch routers. The aggregation router transmits the control packet to each of the target branch routers via an Ethernet link between the aggregation router and the target branch router.

For example, assume that a command keyword "console" indicates that the control command is for the branch router, and a command keyword "local" indicates that the control command is for the aggregation router. When a command line "console Ethernet 0/1/1 display version" is received via the Console interface of the aggregation router, the aggregation router determines that the Console command is for the branch router according to the command keyword "console", and further parses the Console command to determine that the Ethernet link interface information is "Ethernet 0/1/1", and the control command is "display version". The aggregation router encapsulates the control command "display version" as the control packet in the Ethernet format, and determines the target branch router based on the Ethernet link interface information "Ethernet 0/1/1". In particular, the determined Ethernet link interface of the target branch router on the aggregation router is Ethernet 0/1/1.

In some examples, when the aggregation router receives the management packet including the first Console command via the network management interface of the aggregation router, the management packet further includes the Ethernet link interface information, so that the aggregation router determines the target branch router for the control packet based on the Ethernet link interface information.

As shown in FIG. 1, the aggregation router transmits the control packet to the target branch router via the Ethernet link between the aggregation router and the target branch router, so that the target branch router decapsulates the control packet to obtain the first Console command, and executes the first Console command.

The aggregation router may encapsulate the first Console command as the control packet in the Ethernet format in multiple manners. For example, when the control packet is encapsulated as an Ethernet packet in an IEEE802.3/802.2 LLC format, the first Console command may be encapsulated into a data field. And when the control packet is encapsulated as an Ethernet packet in an IEEE802.3/802.2 SNAP format, the first Console command may be encapsulated into a data field.

At block 203, a feedback packet transmitted from the target branch router is received via the Ethernet link between the aggregation router and the target branch router, wherein the feedback packet includes an output result obtained by the target branch router through executing the first Console command.

After receiving the control packet, the target branch router parses the type field to obtain the preset type character, parses the data field to obtain the first Console command, and executes the first Console command to generate an output result. The target branch router encapsulates the output result as the feedback packet in the Ethernet format. For example, when the feedback packet is encapsulated as the Ethernet packet in the IEEE802.3/802.2 LLC format, the output result is encapsulated into the data field. When the feedback packet is encapsulated as the Ethernet packet in the IEEE802.3/802.2 SNAP format, the output result is encapsulated into the data field. As shown in FIG. 1, the aggregation router further receives the feedback packet from the target branch router via the Ethernet link between the aggregation router and the target branch router, and the feedback packet includes the output result obtained by the target branch router through executing the first Console command.

In some examples, the control packet and the feedback packet have the same Ethernet format. The type field in the Ethernet format includes the preset type character. The data field in the Ethernet format includes the first Console command or the output result, and data field further includes a flag used to distinguish between the control packet and the feedback packet. In some examples, the data field in the Ethernet format includes the flag used to indicate a type of a packet between the control packet and the feedback packet, and data field content, wherein the field content includes the first Console command when the flag indicates that the type of the packet is the control packet, and the field content includes the output result when the flag indicates that the type of the packet is the feedback packet.

Figure 4:
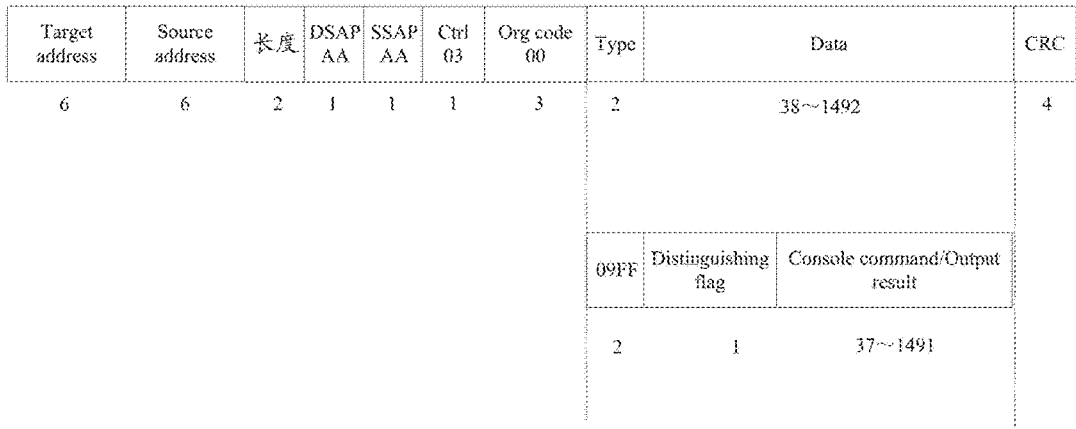
FIG. 4 is a schematic diagram illustrating a structure of a control packet and a feedback packet according to some examples of the present disclosure.

FIG. 4 is a schematic diagram illustrating a structure of a control packet and a feedback packet according to some examples of the present disclosure. As shown in FIG. 4, the control packet and the feedback packet have the same Ethernet format, are respectively encapsulated as Ethernet packets in the IEEE802.3/802.2 LLC format.

The Ethernet packet includes the type field (2 bytes in length) and a data field. The type field includes a preset type character 09FF used to indicate that a packet type of the Ethernet packet is the control packet or the feedback packet. The data field includes a distinguishing flag (1 byte in length) and content of the data field (37~1491 bytes in length). The distinguishing flag is used to indicate the packet type of the Ethernet packet between the control packet and the feedback packet. When the Ethernet packet is the control packet, the content of the data field includes the Console command. When the Ethernet packet is the feedback packet, the content of the data field includes the output result. For example, when the Ethernet packet is the control packet, the distinguishing packet is set as 1, and the Console command is added into the content of the data packet. When the Ethernet packet is the feedback packet, the distinguishing flag is set as 0, and the output result is added into the content of the data field.

In some examples, the control packet and the feedback packet have the same Ethernet format. A Sub-Network Access Protocol (SNAP) field in the Ethernet format includes a preset type character. A data field in the Ethernet format includes the first Console command or the output result, and the data field further includes the flag used to distinguish between the control packet and the feedback packet.

Figures 5, 6:
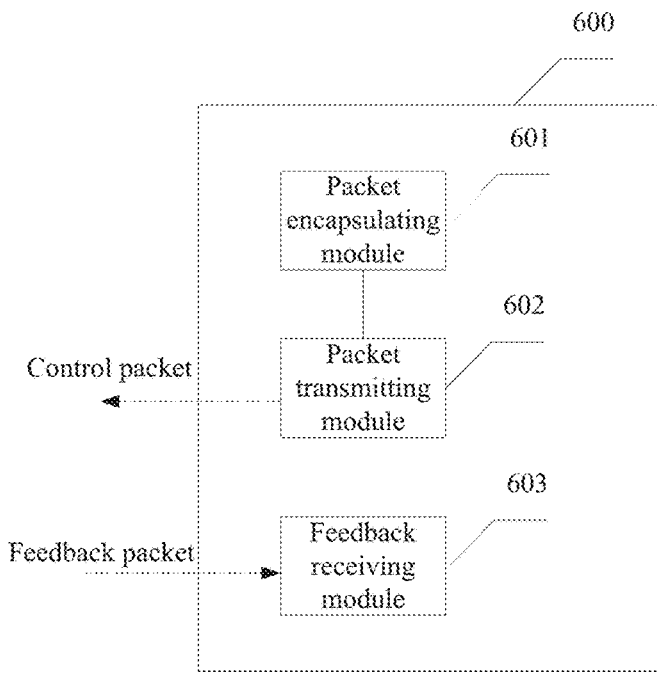
FIG. 5 is a schematic diagram illustrating another structure of a control packet and a feedback packet according to some examples of the present disclosure.
FIG. 6 is a schematic diagram illustrating a structure of a router controlling apparatus applying to an aggregation router according to some examples of the present disclosure.

FIG. 5 is a schematic diagram illustrating another structure of a control packet and a feedback packet according to some examples of the present disclosure. As shown in FIG. 5, the control packet or the feedback packet are respectively encapsulated as an Ethernet packet in the same IEEE802.3/802.2 SNAP format.

The Ethernet packet includes the type field (2 bytes in length) and a data field. The type field includes a preset type character 09FF used to indicate that a packet type of the Ethernet packet is the control packet or the feedback packet. The data field includes a distinguishing flag (1 byte in length) and content of the data field (37~1491 bytes in length). The distinguishing flag in the data field is used to indicate the packet type of the Ethernet packet between the control packet and the feedback packet. When the Ethernet packet is the control packet, the content of the data field includes the Console command. When the Ethernet packet is the feedback packet, the content of the data field includes the output result. For example, when the Ethernet packet is the control packet, the distinguishing flag is set as 1, and the Console command is added into the content of the data packet. When the Ethernet packet is the feedback packet, the distinguishing flag is set as 0, and the output result is added into the content of the data field.

In some examples, the control packet may be a broadcast Ethernet packet. Thus, when the aggregation router may not obtain the MAC address of the branch router and a target MAC address added into the control packet is different from the MAC address of the branch router, the target branch router may not discard the received control packet. And the feedback packet may be the broadcast Ethernet packet. Thus, when the aggregation router may not obtain the MAC address of the branch router and a target MAC address added into the feedback packet is different from the MAC address of the branch router, the aggregation router may not discard the received feedback packet.

A router controlling method is further provided according to some examples of the present disclosure, which applies to a branch router.

Figure 3:
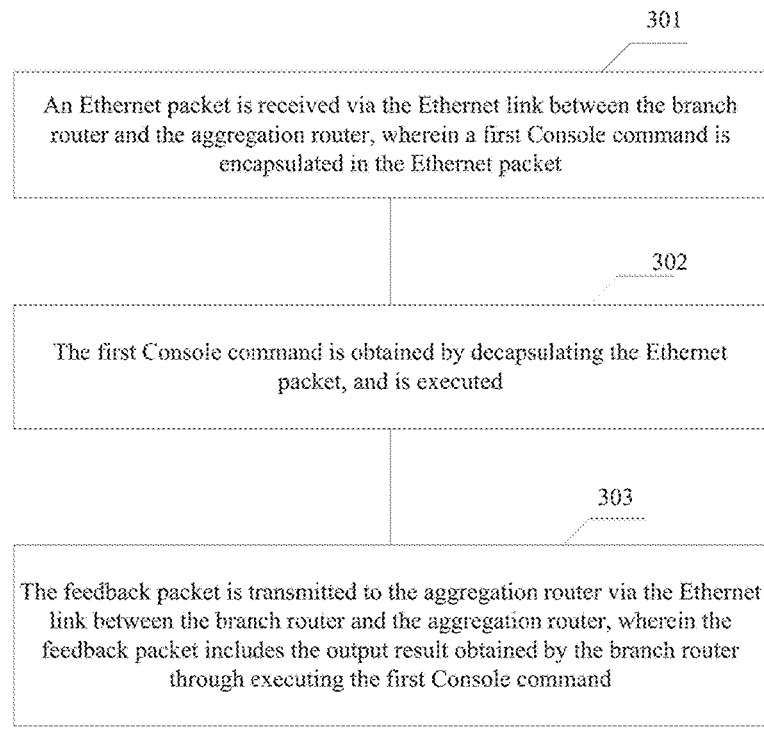
FIG. 3 is a schematic diagram illustrating a router controlling method applying to a branch router in a network topology in FIG. 1 according to some examples of the present disclosure.

FIG. 3 is a schematic diagram illustrating a router controlling method applying to a branch router in a network topology in FIG. 1 according to some examples of the present disclosure. This method applies to the branch router, and there is an Ethernet link between the branch router and the aggregation router.

As shown in FIG. 3, the method includes procedures as follows.

At block 301, an Ethernet packet is received via the Ethernet link between the branch router and the aggregation router, wherein a first Console command is encapsulated in the Ethernet packet.

At block 302, the first Console command is obtained by decapsulating the Ethernet packet, and is executed.

In particular, the branch router obtains an Ethernet header of the Ethernet packet, and obtains a type character 09FF from a type field, so that it is determined that the Ethernet packet is the control packet or the feedback packet. Thus, even though a target MAC address of the Ethernet packet is different from a MAC address of the branch router, the branch router may not discard the Ethernet packet, and may decapsulate the Ethernet packet to obtain the first Console command. The branch router forwards the first Console command to the processor itself. The processor executes the first Console command, and obtains an output result.

At block 303, the feedback packet is transmitted to the aggregation router via the Ethernet link between the branch router and the aggregation router, wherein the feedback packet includes the output result obtained by the branch router through executing the first Console command.

The branch router encapsulates the output result as the feedback packet in the Ethernet format, and transmits the feedback packet to the aggregation router via the Ethernet link between the branch router and the aggregation router, wherein the feedback packet includes the output result obtained by the branch router through executing the first Console command.

In some examples above, the Console command encapsulated into the Ethernet packet is transmitted to the branch router via the Ethernet link between the branch router and the aggregation router. Thus, a virtual Console interface link is established via the Ethernet link between the branch router and the aggregation router. The aggregation router can implement strong control for the branch router based on the virtual Console interface link.

According to some examples of the present disclosure, when a certain condition (such as wrong configuration, IP address loss) occurs, as long as the Ethernet link between the aggregation router and the remote branch router is normal, the aggregation router can still control the remote branch router. Thus, human maintenance costs are reduced.

In some examples, a second Console command received from the Console interface of the branch router itself is configured with a higher execution priority than that of the first Console command, so as to ensure that the Console interface of the branch router itself has a higher control power.

In some examples, when the first Console command is received, the first Console command is executed. When the second Console command is received via the Console interface of the branch router itself in a preset time period after the first Console command is received, the first Console command is suspended, and the second Console command is decapsulated, is executed. After the process of executing the second Console command is completed, the branch router resumes executing the first Console command.

In some examples, when a second Console command is received from a Console interface in a preset period after the first Console command is obtained, the first Console command being executed is aborted, and the second Console command is decapsulated and executed.

In some examples, when the second Console command is received via the Console interface of the branch router in a preset time period after the first Console command is received, the second Console command is executed. After the process of executing the second Console command is completed, the first Console command is executed. When the second Console command is not received via the Console interface of the branch router in the preset time period after the first Console command is received, the first Console command is executed.

In some examples, when the second Console command is received via the Console interface of the branch router in a preset time period after the first Console command is received, the second Console command is executed. When the second Console command is not received via the Console interface of the branch router in the preset time period after the first Console command is received, the first Console command is executed.

A router controlling apparatus is further provided according to sonic examples of the present disclosure. The apparatus applies to an aggregation router.

FIG. 6 is a schematic diagram illustrating a structure of a router controlling apparatus applying to an aggregation router according to some examples of the present disclosure. The apparatus applies to an aggregation router. There is an Ethernet link between the branch router and the aggregation router As shown in FIG. 6, the router controlling apparatus 600 applying the aggregation router includes a packet encapsulating module 601, a packet transmitting module 602 and a feedback receiving module 603.

The packet encapsulating module 601 is to encapsulate a first Console command as a control packet in an Ethernet format.

The packet transmitting module 602 is to determine a target branch router of the control packet, transmit the control packet to the target branch router via the Ethernet link between the aggregation router and the target branch router, so that the target branch router decapsulates the control packet to obtain and execute the first Console command.

The feedback receiving module 603 is to receive a feedback packet from the target branch router via the Ethernet link between the aggregation router and the target branch router, wherein the feedback packet comprises an output result obtained by the target branch router through executing the first Console command.

In some examples, the packet encapsulating module 601 is further to receive a command line including the first Console command via a Console interface of the aggregation router, and parse the command line to obtain the first Console command.

In some examples, the packet encapsulating module 601 is further to receive a management packet including the first Console command via a network management interface of the aggregation router, and parse the management packet to obtain the first Console command.

In some examples, the packet transmitting module 602 is to parse the command line to obtain Ethernet link interface information, determine the target branch router of the control packet based on the Ethernet link interface information.

In some examples, the packet transmitting module 602 is to parse the management packet to obtain Ethernet link interface information, determine the target branch router of the control packet based on the Ethernet link interface information.

In some examples, the control packet and the feedback packet have the same Ethernet format. A type field of the Ethernet format includes a preset type character, and the type character indicates that a type of a packet is the control packet or the feedback packet. A data field of the Ethernet format includes a flag used to indicate the type of the packet between the control packet and the feedback packet, and data field content, wherein the field content comprises the first Console command when the flag indicates that the packet is the control packet, and the field content comprises the output result when the flag indicates that the packet is the feedback packet.

Figure 7:
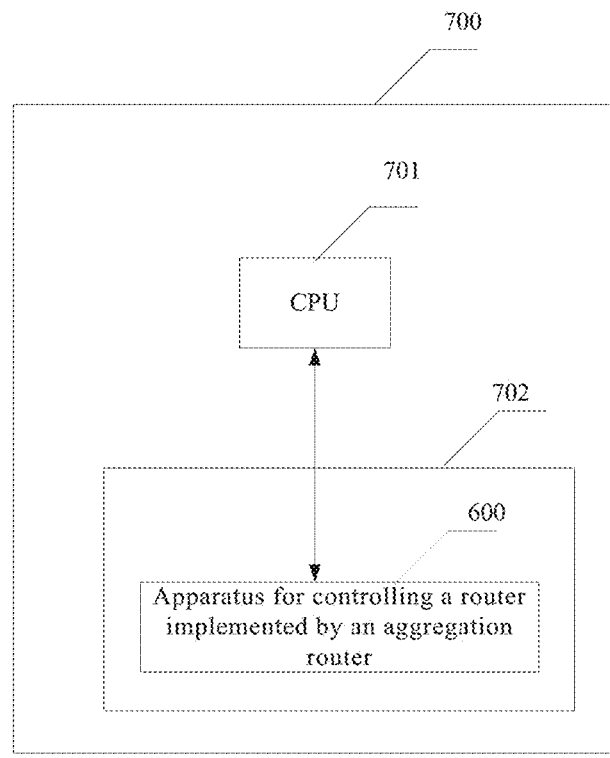
FIG. 7 is a schematic diagram illustrating a hardware structure of an aggregation router including a router controlling apparatus according to some examples of the present disclosure.

FIG. 7 is a schematic diagram illustrating a hardware structure of an aggregation router including a router controlling apparatus according to some examples of the present disclosure.

As shown in FIG. 7, the aggregation router 700 includes a processor such as a CPU 701 and a non-transitory machine readable storage medium 702. The aggregation router 700 further includes other hardware.

The non-transitory machine readable storage medium 702 is to store machine readable instructions that are executable by the CPU 701. The operations carried out by the machine readable instructions when executed by the CPU 701 includes the functions carried out by the router controlling apparatus 600 applying to the aggregation router.

The CPU 701 is to communicate with the non-transitory machine readable storage medium 702, to read and execute the machine readable instructions stored in the non-transitory machine readable storage medium 702 so as to implement the functions carried out by the router controlling apparatus 600 applying to the aggregation router.

The router controlling apparatus 600 applying to the aggregation router is a logic apparatus, which may be implemented by the CPU 701 executing machine readable instructions in the non-transitory machine readable storage medium 702. When the corresponding machine readable instructions are executed, the router controlling apparatus 600 executes the corresponding operations according to the foregoing method.

The non-transitory machine readable storage medium 702 may be a physical storage device such as an electronic storage device, a magnetic storage device, an optical storage device etc., and may include or store information such as instruction, data etc. For example, the non-transitory machine readable storage medium 702 may be a Radom Access Memory (RAM), a volatile memory, a non-volatile memory, a flash memory, a storage drive (such as a hard disk drive), a solid-state drive, a storage disk (such as a Disc, DVD, etc.), a similar storage medium, or a combination thereof. Each of machine readable storage mediums as described above may be non-transitory.

A router controlling apparatus is further provided according to some examples of the present disclosure. The apparatus applies to a branch router.

Figure 8:
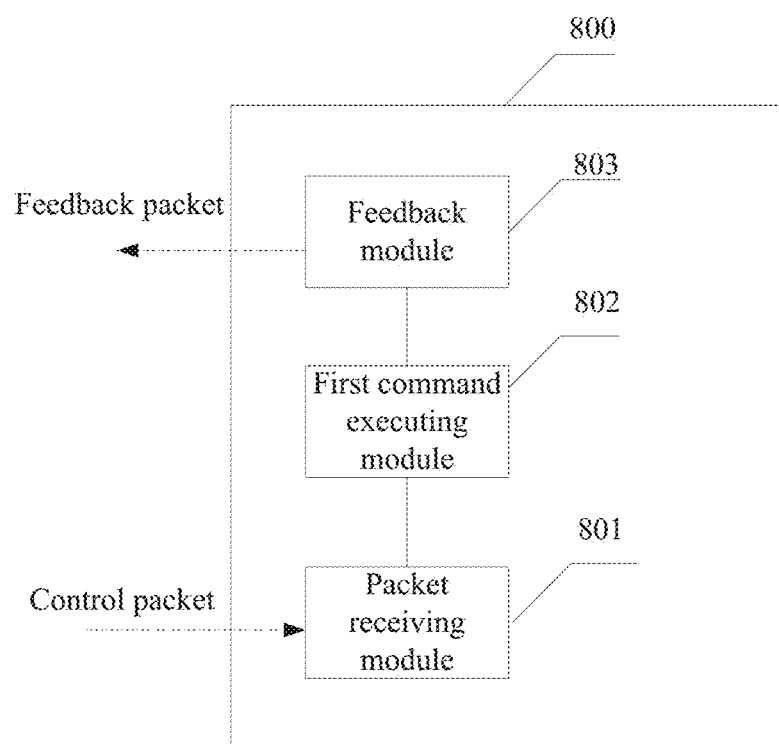
FIG. 8 is a schematic diagram illustrating a structure of a router controlling apparatus applying to a branch router according to some examples of the present disclosure.

FIG. 8 is a schematic diagram illustrating a structure of a router controlling apparatus applying to a branch router according to some examples of the present disclosure. The apparatus applies to a branch router. There is an Ethernet link between the branch router and the aggregation router.

As shown in FIG. 8, the router controlling apparatus 600 applying the branch router includes a packet receiving module 801, a first command executing module 802 and a feedback module 803.

The packet receiving module 801 is to receive an Ethernet packet from the aggregation router via the Ethernet link between the branch router and the aggregation router, wherein a first Console command is encapsulated into the Ethernet packet.

The first command executing module 802 is to decapsulate the Ethernetpacket to obtain the first Console command, execute the first Console command.

The feedback module 803 is to transmit a feedback packet to the aggregation router via the Ethernet link between the branch router and the aggregation router, wherein the feedback packet comprises an output result executed by the branch router through executing the first Console command.

Figure 9:
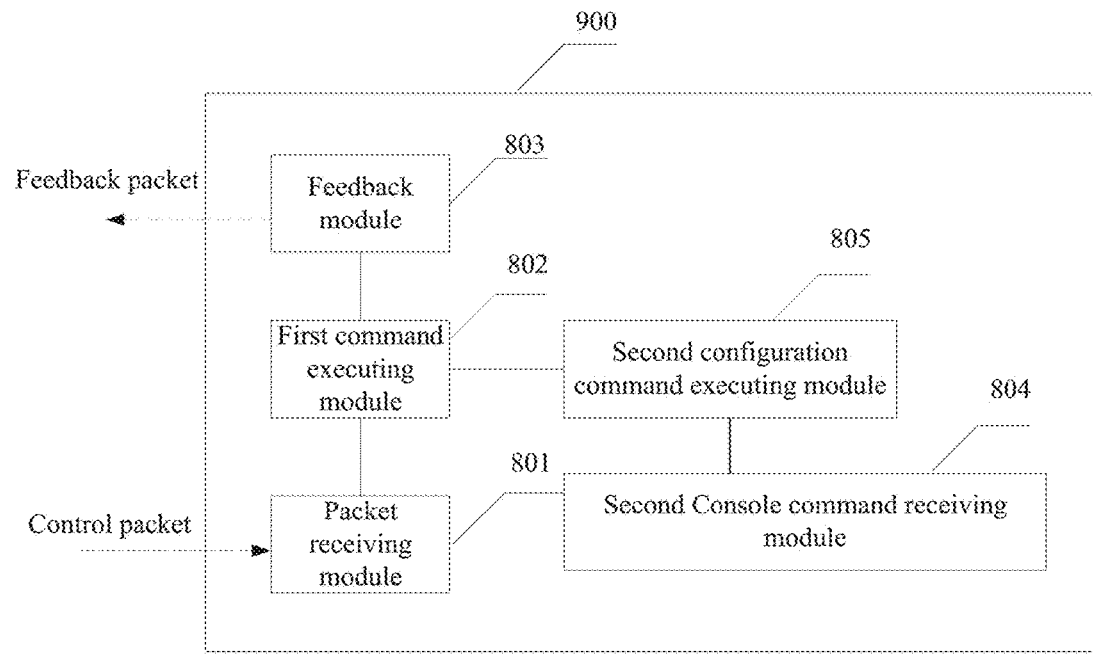
FIG. 9 is a schematic diagram illustrating a structure of a router controlling apparatus applying to a branch router according to some examples of the present disclosure.

In some examples, as shown in FIG. 9, an apparatus 900 for controlling a router applying to a branch router includes the packet receiving module 801, the first command executing module 802 and the feedback module 803 as described above. The apparatus 900 further includes a second Console command receiving module 804 and a second command executing module 805.

The second Console command receiving module 804 is to when a second Console command is received from a Console interface in a preset period after the first Console command is obtained.

The second command executing module 805 is to suspend the first Console command being executed, decapsulate and executing the second Console command; and resume executing the first Console command after the process of executing the second Console command is completed.

In some examples, the control packet and the feedback packet have the same Ethernet format. A type field of the Ethernet format includes a preset type character, and the type character indicates that a type of a packet is the control packet or the feedback packet. A data field of the Ethernet format includes a flag used to indicate the type of the packet between the control packet and the feedback packet, and data field content, wherein the field content comprises the first Console command when the flag indicates that the packet is the control packet, and the field content comprises the output result when the flag indicates that the packet is the feedback packet.

Figure 10:
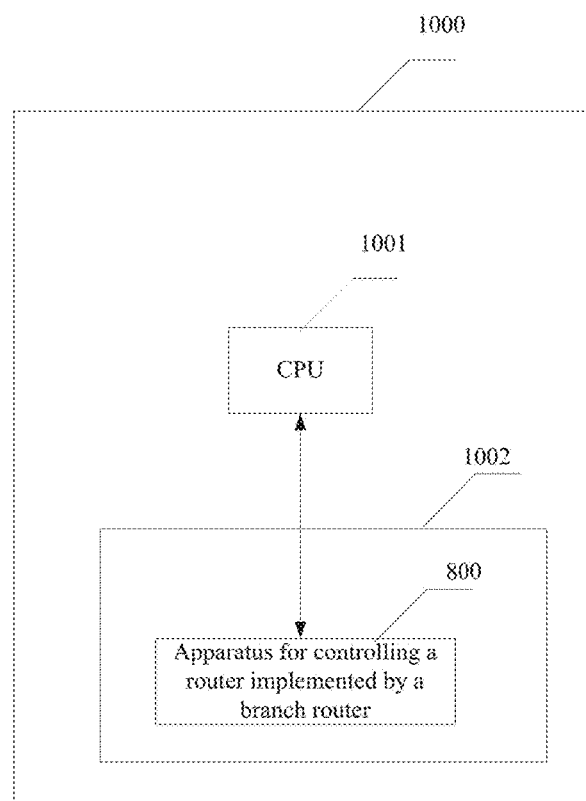
FIG. 10 is a schematic diagram illustrating a hardware structure of a branch router including a router controlling apparatus according to some examples of the present disclosure.

FIG. 10 is a schematic diagram illustrating a hardware structure of a branch router including a router controlling apparatus according to some examples of the present disclosure.

As shown in FIG. 10, the branch router 1000 includes a processor such as a CPU 1001 and a non-transitory machine readable storage medium 1002. The branch router 1000 further includes other hardware.

The non-transitory machine readable storage medium 1002 is to store machine readable instructions that are executable by the CPU 1001. The operations carried out by the machine readable instructions when executed by the CPU 1001 includes the functions carried out by the router controlling apparatus 800 applying to the branch router.

The CPU 1001 is to communicate with the non-transitory machine readable storage medium 1002, to read and execute the machine readable instructions stored in the non-transitory machine readable storage medium 1002 so as to implement the functions carried out by the router controlling apparatus 800 applying to the branch router.

The router controlling apparatus 800 applying to the branch router is a logic apparatus, which may be implemented by the CPU 1001 executing machine readable instructions in the non-transitory machine readable storage medium 1002. When the corresponding machine readable instructions are executed, the router controlling apparatus 800 executes the corresponding operations according to the foregoing method.

The non-transitory machine readable storage medium 1002 may be a physical storage device such as an electronic storage device, a magnetic storage device, an optical storage device etc., and may include or store information such as instructions, data etc. For example, the non-transitory machine readable storage medium 1002 may be a Radom Access Memory (RAM), a volatile memory, a non-volatile memory, a flash memory, a storage drive (such as a hard disk drive), a solid-state drive, a storage disk (such as a disc, DVD, etc.), a similar storage medium, or a combination thereof. Each of machine readable storage mediums as described above may be non-transitory.

It can be seen from above that, a Console control method over an Ethernet link is provided according to some examples of the present disclosure. As long as the Ethernet link between the aggregation router and the remote branch router is normal, the aggregation router can control a remote branch router. Thus, human maintenance costs are reduced.

What is claimed is:

1. A router controlling method, to be implemented by an aggregation router, comprising:
   encapsulating a first Console command as a control packet in an Ethernet format;
   determining a target branch router of the control packet, transmitting the control packet to the target branch router via an Ethernet link between the aggregation router and the target branch router;
   where the aggregation router comprises a Console interface, receiving a command line comprising the first Console command via the Console interface of the aggregation router, and parsing the command line to obtain the first Console command, wherein the process of determining the target branch router of the control packet comprises parsing the command line to obtain the Ethernet link interface information, and determining the target branch router of the control packet based on the Ethernet link interface information;
   where the aggregation router is connected to a host computer via a network management interface, receiving a management packet comprising the first Console command via the network management interface of the aggregation router, and parsing the management packet to obtain the first Console command, wherein the process of determining the target branch router of the control packet comprises parsing the management packet to obtain Ethernet link interface information, and determining the target branch router of the control packet on the Ethernet link interface information; and receiving a feedback packet from the target branch router via the Ethernet link between the aggregation router and the target branch router, wherein the feedback packet comprises an output result obtained by the target branch router through executing the first Console command.

2. The method of claim 1, wherein the control packet and the feedback packet have the same Ethernet format;

a type field of the Ethernet format comprises a preset type character, the type character indicates that a type of a packet is the control packet or the feedback packet;

a data field of the Ethernet format comprises a flag used to indicate the type of the packet between the control packet and the feedback packet, and data field content, wherein the data field content comprises the first Console command when the flag indicates that the type of the packet is the control packet, and the data field content comprises the output result when the flag indicates that the type of the packet is the feedback packet.

3. A router controlling method, to be implemented by a branch router, comprising:

receiving an Ethernet packet from an aggregation router via an Ethernet link between the branch router and the aggregation router, wherein a first Console command is encapsulated in the Ethernet packet and the Ethernet packet comprises a preset type character in a type field indicating that the Ethernet packet is a control packet;

decapsulating the Ethernet packet to obtain the first Console command;

executing the first Console command; and transmitting a feedback packet to the aggregation router via the Ethernet link between the branch router and the aggregation router, wherein the feedback packet comprises an output result executed by the branch router through executing the first Console command; and wherein the Ethernet packet and the feedback packet have the same Ethernet format.

4. The method of claim 3, further comprising:

when a second Console command is received from a Console interface in a preset period after the first Console command is obtained, aborting the first Console command being executed, and decapsulating and executing the second Console command.

5. A router controlling apparatus implemented by an aggregation router, comprising:

a processor; and a non-transitory machine readable storage medium storing instructions to be executed by the processor, the instructions comprising:

a packet encapsulating instruction, to encapsulate a first Console command as a control packet in an Ethernet format;

a packet transmitting instruction, to determine a target branch router of the control packet, transmit the control packet to the target branch router via an Ethernet link between the aggregation router and the target branch router; and a feedback receiving instruction, to receive a feedback packet from the target branch router via the Ethernet link between the aggregation router and the target branch router, wherein the feedback packet comprises an output result obtained by the target branch router through executing the first Console command;

wherein the packet encapsulating instruction is either to receive a command line comprising the first Console command via a Console interface of the aggregation router and parse the command line to obtain the first Console command or to receive a management packet comprising the first Console command via a network management interface of the aggregation router and parse the management packet to obtain the first Console command; and wherein the packet transmitting instruction is either to parse the command line to obtain Ethernet link interface information and determine the target branch router of the control packet based on the Ethernet link interface information or to parse the management packet to obtain Ethernet link interface information, and determine the target branch router of the control packet based on the Ethernet link interface information.

6. The apparatus of claim 5, wherein the control packet and the feedback packet have the same Ethernet format;

a type field of the Ethernet format comprises a preset type character, the type character indicates that a type of a packet is the control packet or the feedback packet;

a data field of the Ethernet format comprises a flag used to indicate the type of the packet between the control packet and the feedback packet, and data field content, wherein the data field content comprises the first Console command when the flag indicates that the packet is the control packet, and the data field content comprises the output result when the flag indicates that the packet is the feedback packet.

7. A router controlling apparatus implemented by a branch router, comprising:

a processor; and a non-transitory machine readable storage medium storing instructions executable by the processor, the instructions comprising:

a packet receiving instruction, to receive an Ethernet packet from an aggregation router via an Ethernet link between the branch router and the aggregation router, wherein a first Console command is encapsulated in the Ethernet packet and the Ethernet packet comprises a preset type character in a type field indicating that the Ethernet packet is a control packet;

a first command executing instruction, to decapsulate the Ethernet packet to obtain the first Console command, and execute the first Console command: and a feedback instruction, to transmit a feedback packet to the aggregation router via the Ethernet link between the branch router and the aggregation router, wherein the feedback packet comprises an output result executed by the branch router through executing the first Console command;

wherein the Ethernet packet and the feedback packet have the same Ethernet format.

8. The apparatus of claim 7, further comprising:

a second Console command receiving instruction, to receive a second Console command, a second command executing instruction to, when the second Console command is received from a Console interface in a preset period after the first Console command is obtained, suspend the first Console command being executed, decapsulate the second Console command, execute the second Console command, and resume executing the first Console command after the process of executing the second Console command is completed.

\* \* \* \* \*